(12) United States Patent
Jamshidi-Roudbari et al.

(10) Patent No.: US 10,402,000 B2
(45) Date of Patent: Sep. 3, 2019

(54) DISPLAY WITH INTEGRATED PRESSURE SENSING UTILIZING CAPACITIVE COUPLING TO CIRCUIT ELEMENTS

(71) Applicant: Apple Inc., Cupertino, CA (US)

(72) Inventors: Abbas Jamshidi-Roudbari, Sunnyvale, CA (US); Shih Chang Chang, Cupertino, CA (US); Cheng-Ho Yu, Cupertino, CA (US); Ting-Kuo Chang, Hsinchu (TW)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/784,509

(22) Filed: Mar. 4, 2013

(65) Prior Publication Data

US 2014/0247239 A1    Sep. 4, 2014

(51) Int. Cl.
*G06F 3/044* (2006.01)
*G06F 3/041* (2006.01)

(52) U.S. Cl.
CPC ............ *G06F 3/0414* (2013.01); *G06F 3/044* (2013.01); *G06F 2203/04103* (2013.01); *G06F 2203/04105* (2013.01); *G06F 2203/04112* (2013.01)

(58) Field of Classification Search
CPC ........ G06F 3/044; G06F 3/0414; G06F 3/045; G06F 3/36; G06F 2203/04103; G06F 2203/04105; G06F 2203/04112; G09G 3/36; G02F 1/13338
USPC .................. 345/173–174; 349/12; 178/18.06
See application file for complete search history.

(56) References Cited

U.S. PATENT DOCUMENTS

| | | | |
|---|---|---|---|
| 4,290,052 A * | 9/1981 | Eichelberger | G06F 3/044 341/33 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |

(Continued)

FOREIGN PATENT DOCUMENTS

| JP | 2000-163031 A | 6/2000 |
|---|---|---|
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Jennifer Mehmood
*Assistant Examiner* — James S Nokham
(74) *Attorney, Agent, or Firm* — Kubota & Basol LLP

(57) ABSTRACT

A touch sensitive device that can detect the amount of pressure being applied to a touch screen from a user or other external object is provided. A spacer of the touch screen can be coated with a layer of conductive material and the change in capacitance between the spacer and various circuit elements of the touch screen can be measured. The change in capacitance can be correlated to the amount of pressure being applied to the touch screen, thus providing a method to determine the pressure being applied. During operation of the device, the system can time multiplex touch, display and pressure sensing operations so as to take advantage of an integrated touch and display architecture.

24 Claims, 16 Drawing Sheets

(56) References Cited

U.S. PATENT DOCUMENTS

| | | | |
|---|---|---|---|
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2006/0026521 | A1 | 2/2006 | Hotelling et al. |
| 2006/0109222 | A1* | 5/2006 | Lee et al. .......... 345/88 |
| 2006/0132462 | A1* | 6/2006 | Geaghan ........ G06F 3/044 345/173 |
| 2006/0197753 | A1 | 9/2006 | Hotelling |
| 2008/0018611 | A1* | 1/2008 | Serban ........ G06F 3/0416 345/173 |
| 2008/0158199 | A1* | 7/2008 | Lee et al. ............ 345/174 |
| 2008/0309627 | A1* | 12/2008 | Hotelling ...... G02F 1/134363 345/173 |
| 2009/0179868 | A1* | 7/2009 | Ayres ............ G06F 3/044 345/173 |
| 2010/0013793 | A1* | 1/2010 | Abileah et al. .......... 345/174 |
| 2010/0188361 | A1* | 7/2010 | Kim ............ G02F 1/13338 345/174 |
| 2010/0194697 | A1* | 8/2010 | Hotelling et al. ......... 345/173 |
| 2011/0080373 | A1* | 4/2011 | Wang ............ G06F 3/044 345/174 |
| 2011/0267305 | A1* | 11/2011 | Shahparnia ...... G06F 3/0412 345/174 |
| 2012/0162094 | A1* | 6/2012 | Kent ............ G06F 3/03547 345/173 |
| 2012/0206664 | A1* | 8/2012 | Brown ............ G06F 3/044 349/12 |
| 2013/0090873 | A1* | 4/2013 | Lundstrum ........ H03K 17/962 702/64 |
| 2013/0257786 | A1* | 10/2013 | Brown ............ G06F 3/044 345/174 |
| 2013/0293508 | A1* | 11/2013 | Lin ............ G06F 3/044 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

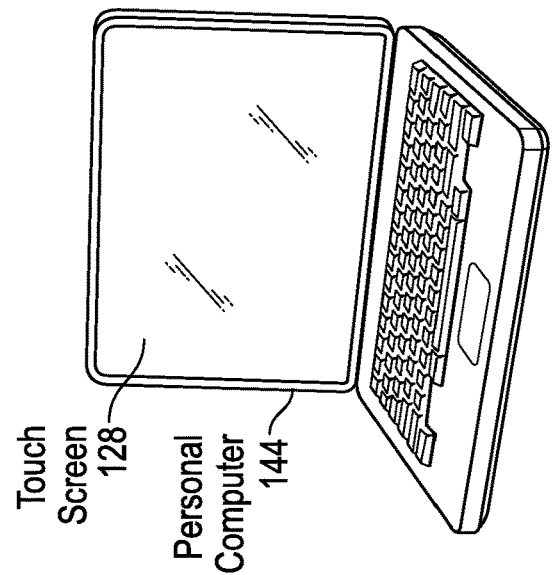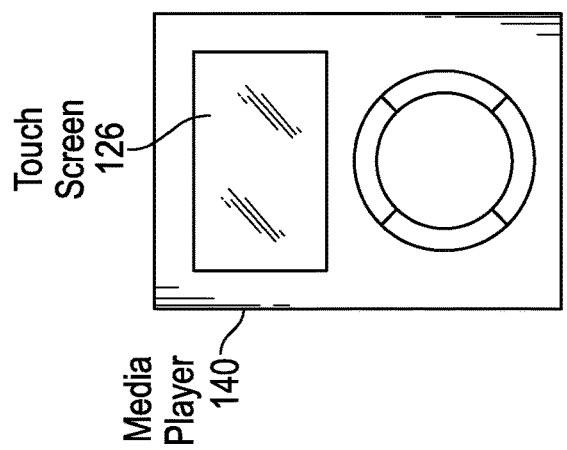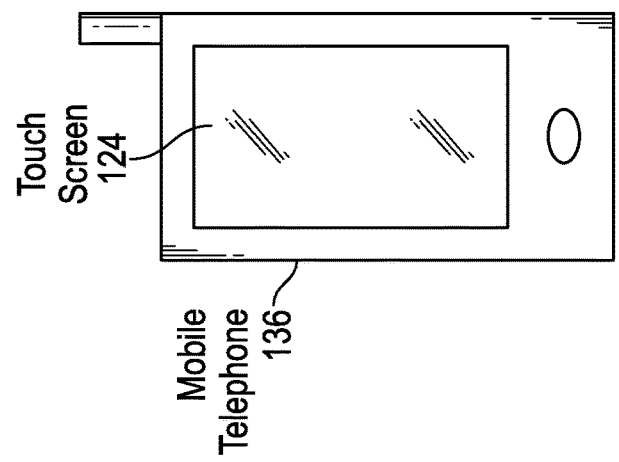

DISPLAY WITH INTEGRATED PRESSURE SENSING UTILIZING CAPACITIVE COUPLING TO CIRCUIT ELEMENTS

FIELD OF THE DISCLOSURE

This relates generally to touch sensing, and more particularly to touch pressure sensing for integrated display touch screens.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display node stackup (i.e., the stacked material layers forming the display nodes). While the system described above can be used to detect the location on the screen of touches from a user or an object, some applications of the device may require knowledge of the amount of force of the touch as well as its location.

SUMMARY OF THE DISCLOSURE

The following description includes examples of detecting the amount of force being applied to a touch screen from a user or other external object. In one example, a layer of conductive material can be deposited on a photo spacer of the touch screen and the change in capacitance between the spacer and various circuit elements of the touch screen can be measured. The change in capacitance can be correlated to the amount of force being applied to the touch screen, thus providing a method to determine the force being applied. During operation of the device, the system can time multiplex touch, display and pressure sensing operations so as to take advantage of an integrated touch and display architecture.

BRIEF DESCRIPTION OF THE DRAWINGS

FIGS. 1A-1C illustrate example systems in which a touch screen according to examples of the disclosure may be implemented.

DETAILED DESCRIPTION

Figure 2:
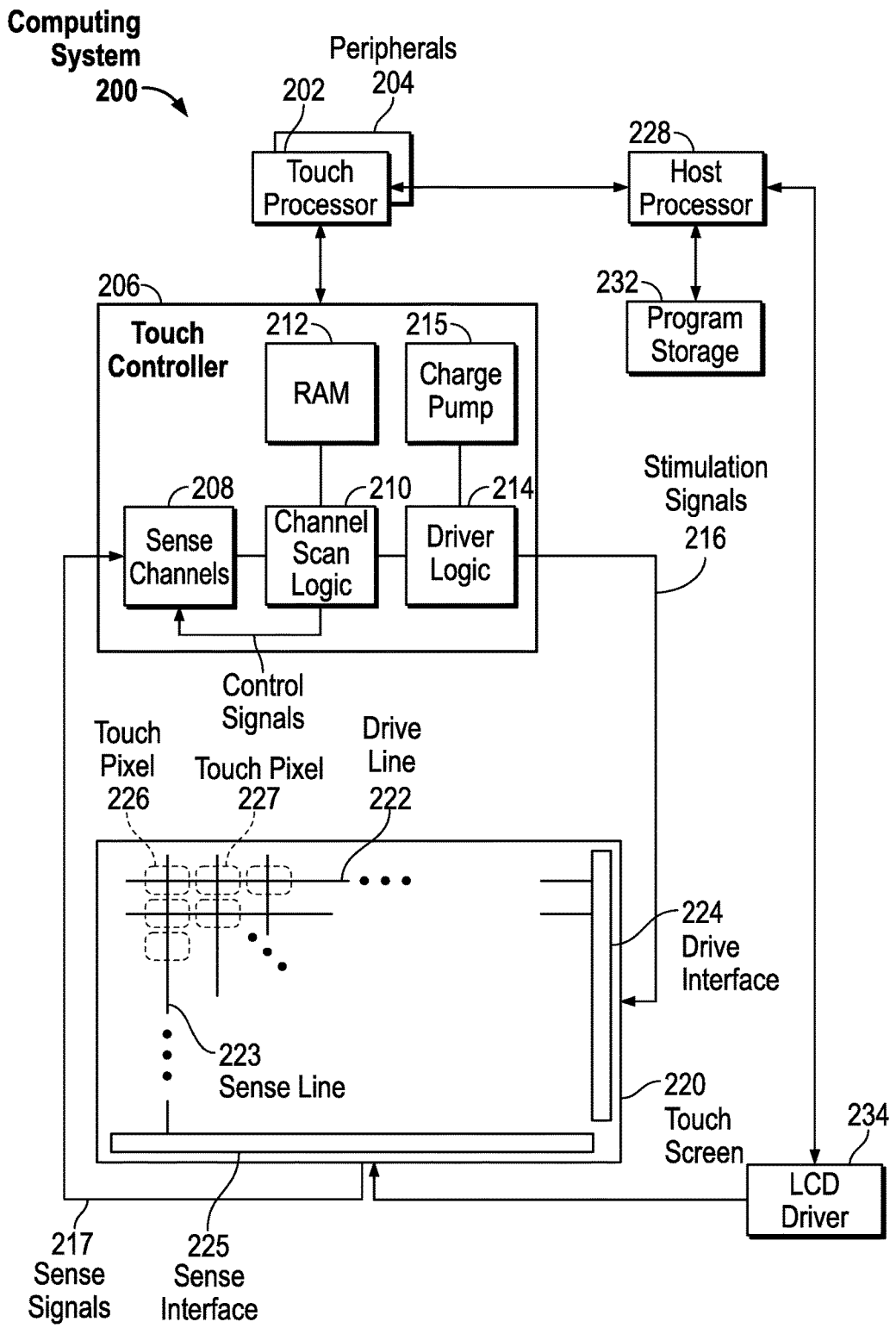
FIG. 2 is a block diagram of an example computing system that illustrates one implementation of an example touch screen according to examples of the disclosure.

In the following description of examples, reference is made to the accompanying drawings which form a part hereof, and in which it is shown by way of illustration specific examples of the disclosure that can be practiced. It is to be understood that other examples can be used and structural changes can be made without departing from the scope of the examples of this disclosure.

The following description relates to the integration of pressure sensing circuitry into an integrated touch screen. An integrated touch screen integrates touch sensing circuitry into a display panel stackup (i.e., the stacked material layers forming the display) of a display such as an LCD display. For example, touch sensing circuitry can be integrated into the display node stackups of integrated touch screens. Display node stackups can be manufactured by processes including depositing, masking, etching, doping, etc., of materials such as conductive materials (e.g., metal, substantially transparent conductors), semiconductive materials (e.g., polycrystalline silicon (Poly-Si)), and dielectric materials (e.g., SiO2, organic materials, SiNx). Various elements formed within a display node stackup can operate as circuitry of the display system to generate an image on the display, while other elements can operate as circuitry of a touch sensing system that senses one or more touches on or near the display. Still other elements can perform both functions at different times. While the examples herein are described in reference to LCD displays, it is understood that alternative displays may be utilized instead of the LCD display.

FIGS. 1A-1C illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Although not shown in the figures, the personal computer 144 can also be a tablet computer or a desktop computer with a touch-sensitive display. Touch screens 124, 126, and 128 may be based on, for example, self capacitance or mutual capacitance, or another touch sensing technology. A mutual capacitance based touch system can include, for example, drive regions and sense regions, such as drive lines and sense lines. For example, drive lines can be formed in rows while sense lines can be formed in columns. Touch nodes can be formed at the intersections of the rows and columns. During operation, the rows can be stimulated with an AC waveform and a mutual capacitance can be formed between the row and the column of the touch node. As an object approaches the touch node, some of the charge being coupled between the row and column of the touch node can instead be coupled onto the object. This reduction in charge coupling across the touch node can result in a net decrease in the mutual capacitance between the row and the column and a reduction in the AC waveform being coupled across the touch node. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

FIG. 2 is a block diagram of an example computing system 200 that illustrates one implementation of an example touch screen 220 according to examples of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is a sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch nodes), such as touch nodes 226 and 227. This way of understanding can be particularly useful when touch screen 220 is viewed as capturing an "image" of touch. In other words, after touch controller 206 has determined whether a touch has been detected at each touch node in the touch screen, the pattern of touch nodes in the touch screen at which a touch occurred can be thought of as an "image" of touch (e.g. a pattern of fingers touching the touch screen).

Figure 3:
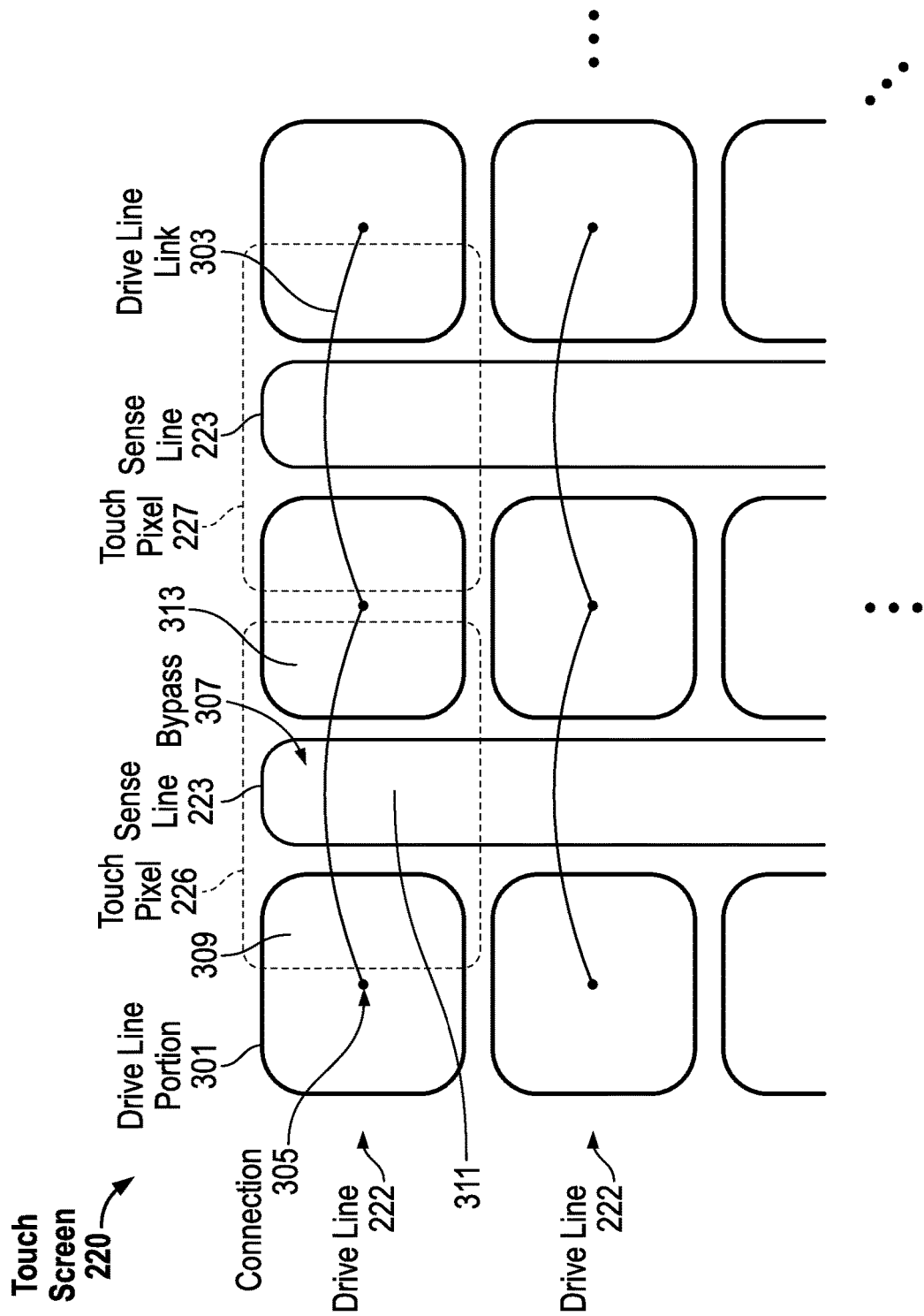
FIG. 3 is a more detailed view of a touch screen showing an example configuration of drive lines and sense lines according to examples of the disclosure.

In some example examples, touch screen 220 can be an integrated touch screen in which touch sensing circuit elements of the touch sensing system can be integrated into the display node stackups of a display. An example integrated touch screen in which examples of the disclosure can be implemented with now be described with reference to FIGS. 3-6. FIG. 3 is a more detailed view of touch screen 220 showing an example configuration of drive lines 222 and sense lines 223 according to examples of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch nodes such as touch nodes 226 and 227. Drive lines 222 (i.e., drive line segments 301 and corresponding drive line links 303) and sense lines 223 can be formed of electrical circuit elements in touch screen 220. In the example configuration of FIG. 3, each of touch nodes 226 and 227 can include a portion of one drive line segment 301, a portion of a sense line 223, and a portion of another drive line segment 301. For example, touch node 226 can include a right-half portion 309 of a drive line segment on one side of a portion 311 of a sense line, and a left-half portion 313 of a drive line segment on the opposite side of portion 311 of the sense line.

Figure 4:
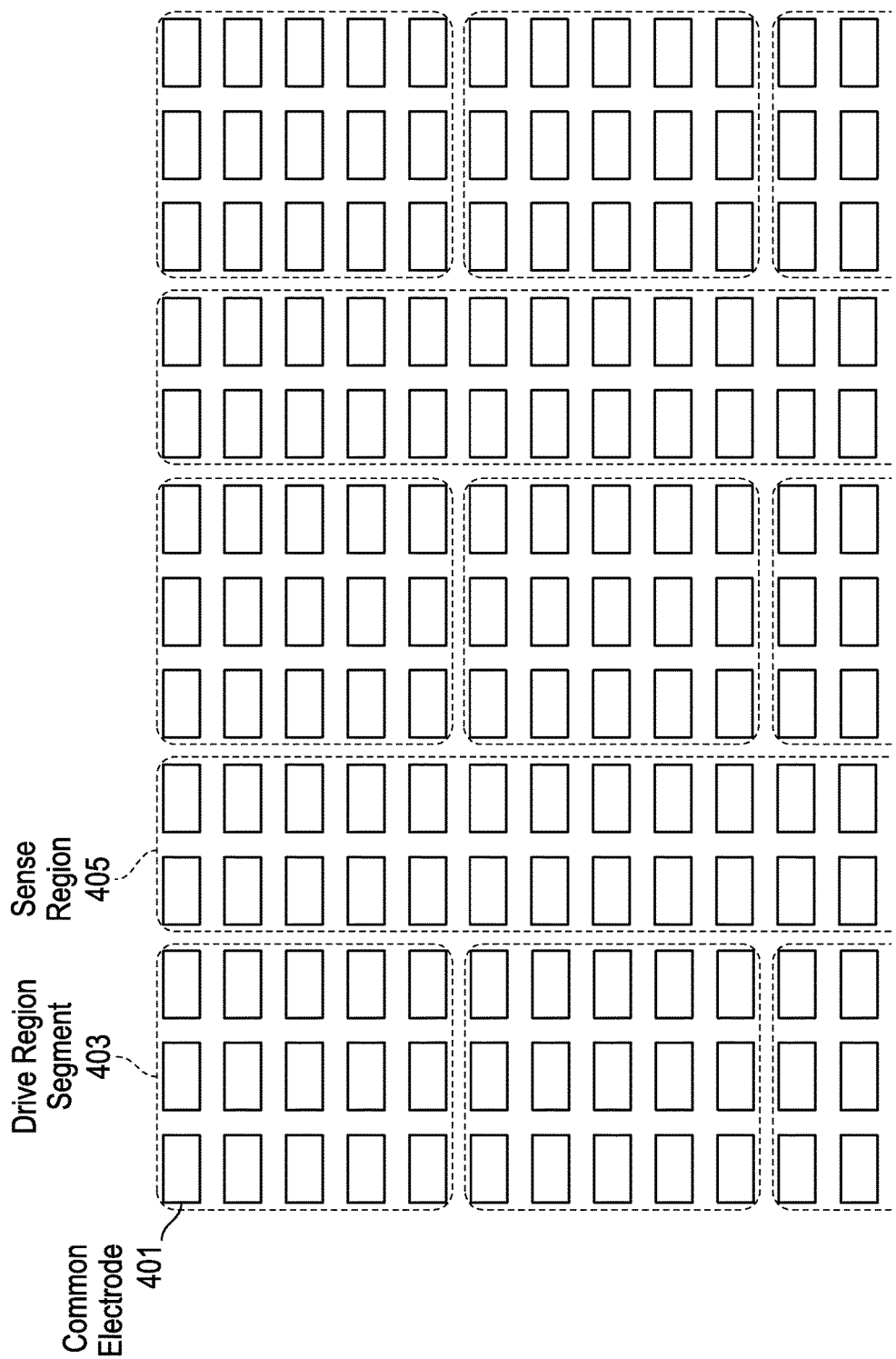
FIG. 4 illustrates an example configuration in which common electrodes (Vcom) can form portions of the touch sensing circuitry of a touch sensing system.

The circuit elements can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display node includes a common electrode 401, which is a circuit element of the display system circuitry in the node stackup (i.e., the stacked material layers forming the display nodes) of the display nodes of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display node stackups can be multi-function circuit elements and other circuit elements may be single-function circuit elements. In other examples, all of the circuit elements of the display node stackups may be single-function circuit elements.

In addition, although example examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although example examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display nodes into a region can mean operating the multi-function circuit elements of the display nodes together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display nodes of the touch screen can operate in both the display phase and the touch phase. For example, during a touch phase, common electrodes 401 can be grouped together to form touch signal lines, such as drive regions and sense regions. In some examples circuit elements can be grouped to form a continuous touch signal line of one type and a segmented touch signal line of another type. For example, FIG. 4 shows one example in which drive region segments 403 and sense regions 405 correspond to drive line segments 301 and sense lines 223 of touch screen 220. Other configurations are possible in other examples; for example, common electrodes 401 could be grouped together such that drive lines are each formed of a continuous drive region and sense lines are each formed of a plurality of sense region segments linked together through connections that bypass a drive region.

The drive regions in the example of FIG. 3 are shown in FIG. 4 as rectangular regions including a plurality of common electrodes of display nodes, and the sense regions of FIG. 3 are shown in FIG. 4 as rectangular regions including a plurality of common electrodes of display nodes extending the vertical length of the LCD. In some examples, a touch node of the configuration of FIG. 4 can include, for example, a 64×64 area of display nodes. However, the drive and sense regions are not limited to the shapes, orientations, and positions shown, but can include any suitable configurations according to examples of the disclosure. It is to be understood that the display nodes used to form the touch nodes are not limited to those described above, but can be any suitable size or shape to permit touch capabilities according to examples of the disclosure.

Figure 5:
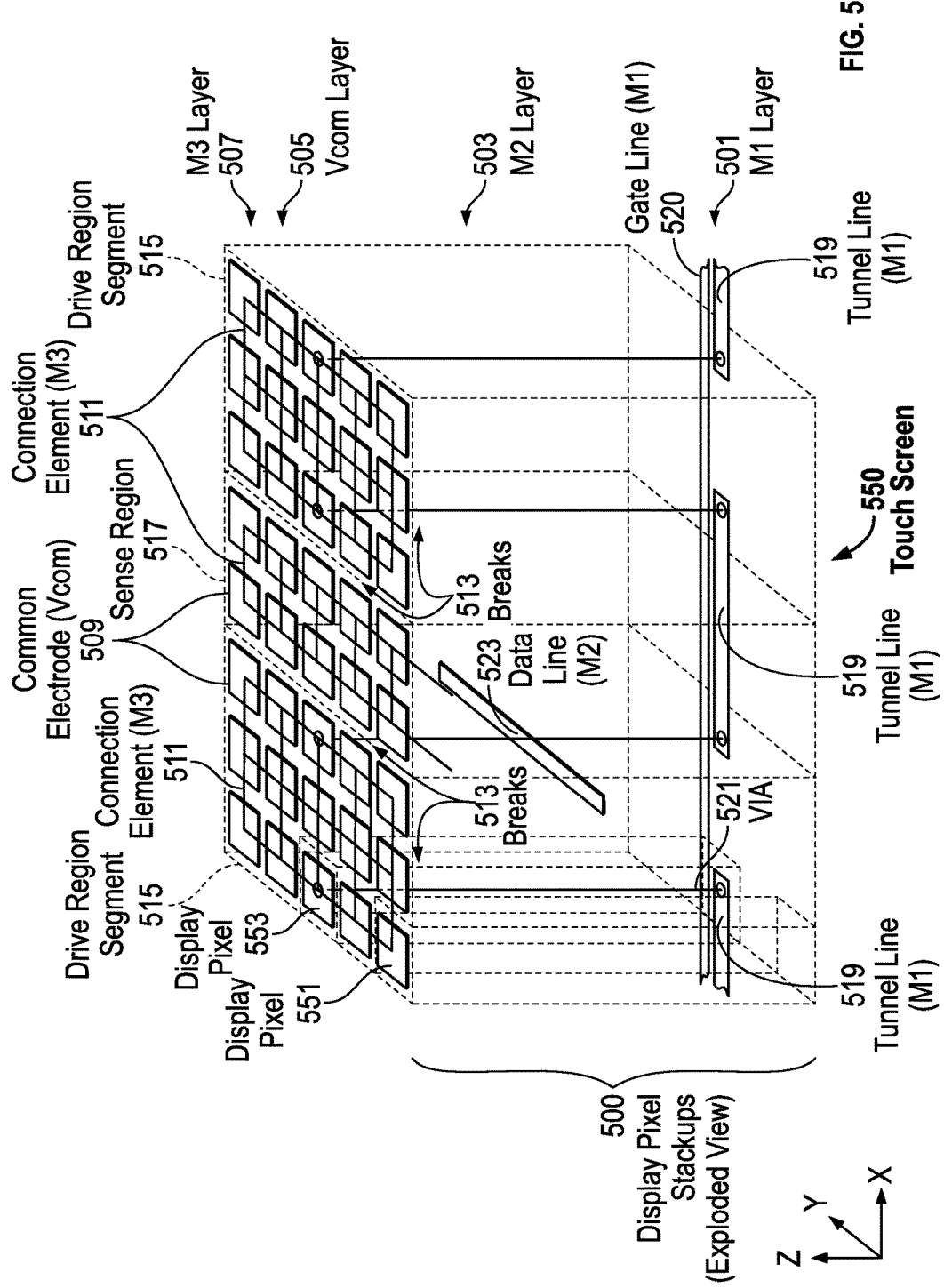
FIG. 5 is a three-dimensional illustration of an exploded view of example display node stackups showing some of the elements within the node stackups of an example integrated touch screen.

FIG. 5 is a three-dimensional illustration of an exploded view (expanded in the z-direction) of example display node stackups 500 showing some of the elements within the node stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display node can include a common electrode 509, such as common electrodes 401 in FIG. 4 that is formed in Vcom layer 505. M3 layer 507 can include connection element 511 that can electrically connect together common electrodes 509. In some display nodes, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include tunnel lines 519 that can electrically connect together drive region segments 515 through connections, such as conductive vias 521, which can electrically connect tunnel line 519 to the grouped common electrodes in drive region segment display nodes. Tunnel line 519 can run through the display nodes in sense region 517 with no connections to the grouped common electrodes in the sense region, e.g., no vias 521 in the sense region. The M1 layer can also include gate lines 520. M2 layer 503 can include data lines 523. Only one gate line 520 and one data line 523 are shown for the sake of clarity; however, a touch screen can include a gate line running through each horizontal row of display nodes and multiple data lines running through each vertical row of display nodes, for example, one data line for each red, green, blue (RGB) color sub-node in each node in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other node stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, gate lines 520 can be held to a fixed voltage while stimulation signals can be transmitted through a row of drive region segments 515 connected by tunnel lines 519 and conductive vias 521 to form electric fields between the stimulated drive region segments and sense region 517 to create touch nodes, such as touch node 226 in FIG. 2. In this way, the row of connected together drive region segments 515 can operate as a drive line, such as drive line 222, and sense region 517 can operate as a sense line, such as sense line 223. When an object such as a finger approaches or touches a touch node, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch nodes to create an "image" of touch.

Figure 6:
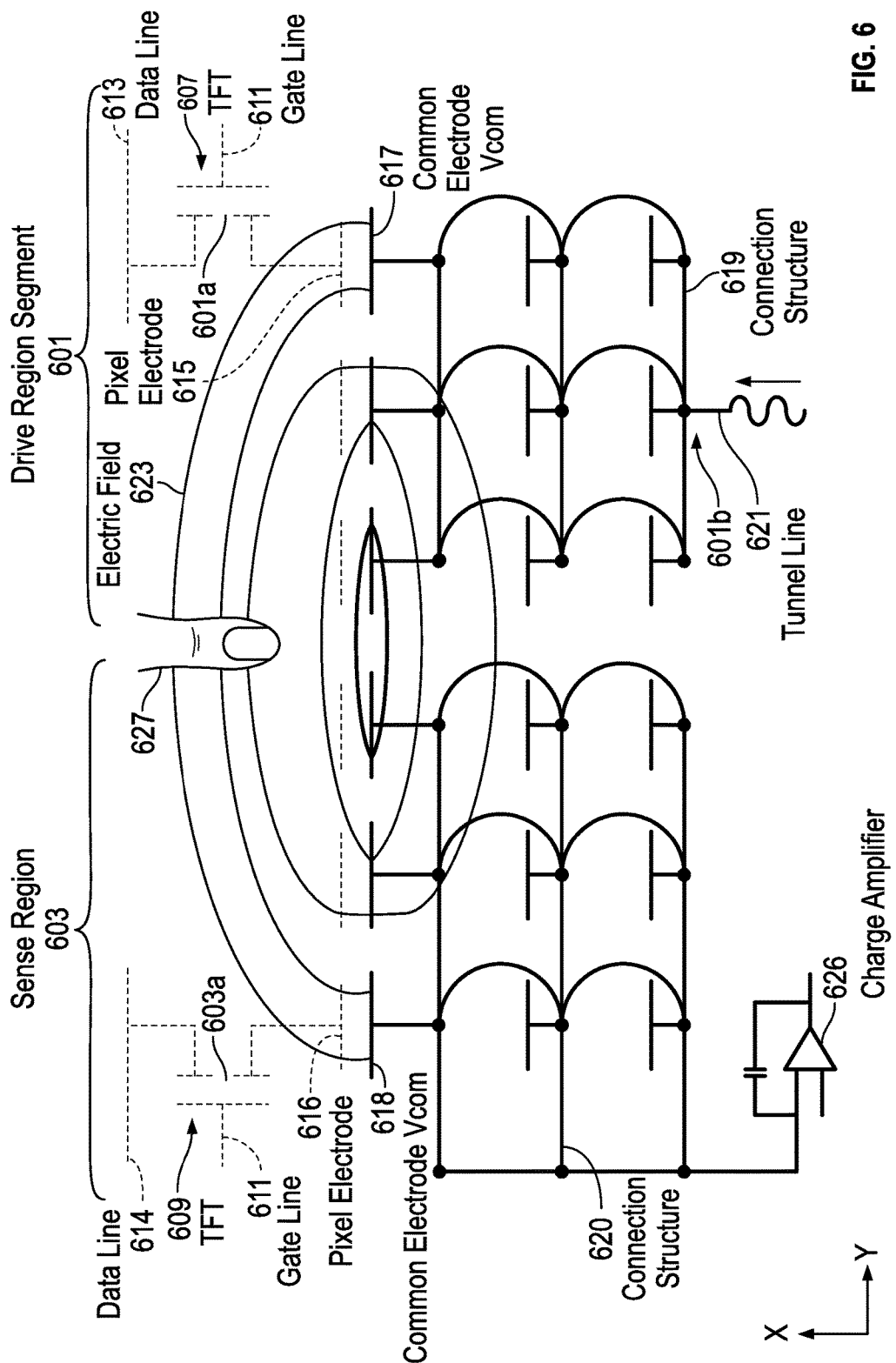
FIG. 6 shows partial circuit diagrams of some of the touch sensing circuitry within display nodes in a drive region segment and a sense region of an example touch screen according to examples of the disclosure.

A touch sensing operation according to examples of the disclosure will be described with reference to FIG. 6. FIG. 6 shows partial circuit diagrams of some of the touch sensing circuitry within display nodes in a drive region segment 601 and a sense region 603 of an example touch screen according to examples of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display node 601a of drive region segment 601 and a single display node 603a of sense region 603. However, it is understood that other display nodes in drive region segment 601 can include the same touch sensing circuitry as described below for display node 601a, and the other display nodes in sense region 603 can include the same touch sensing circuitry as described below for display node 603a. Thus, the description of the operation of display node 601a and display node 603a can be considered as a description of the operation of drive region segment 601 and sense region 603, respectively.

Referring to FIG. 6, drive region segment 601 includes a plurality of display nodes including display node 601a. Display node 601a can include a TFT 607, a gate line 611, a data line 613, a pixel electrode 615, and a common electrode 617. FIG. 6 shows common electrode 617 connected to the common electrodes in other display nodes in drive region segment 601 through a connection element 619 within the display nodes of drive region segment 601 that is used for touch sensing as described in more detail below. Sense region 603 includes a plurality of display nodes including display node 603a. Display node 603a includes a TFT 609, a data line 614, a pixel electrode 616, and a common electrode 618. TFT 609 can be connected to the same gate line 611 as TFT 607. FIG. 6 shows common electrode 618 connected to the common electrodes in other display nodes in sense region 603 through a connection element 620 that can be connected, for example, in a border region of the touch screen to form an element within the display nodes of sense region 603 that is used for touch sensing as described in more detail below.

During a touch sensing phase, gate line 611 can be connected to a power supply, such as a charge pump, that can apply a voltage to maintain TFTs 609 in the "off" state. Drive signals can be applied to common electrodes 617 through a tunnel line 621 that is electrically connected to a portion of connection element 619 within a display node 601b of drive region segment 601. The drive signals, which are transmitted to all common electrodes 617 of the display nodes in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

Referring again to FIG. 5, it can be seen from FIG. 5 that some display nodes of touch screen 550 include different elements than other display nodes. For example, a display node 551 can include a portion of connection element 511 that has breaks 513 in the x-direction and the y-direction, and display node 551 does not include tunnel line 519. A display node 553 can include a portion of connection element 511 that has a break 513 in the x-direction, but not in the y-direction, and can include a portion of tunnel line 519 and a via 521. Other display nodes can include other differences in the configuration of stackup elements including, for example, no breaks 513 in connection element 511, a portion of tunnel line 519 without a via 521, etc.

Figure 7A:
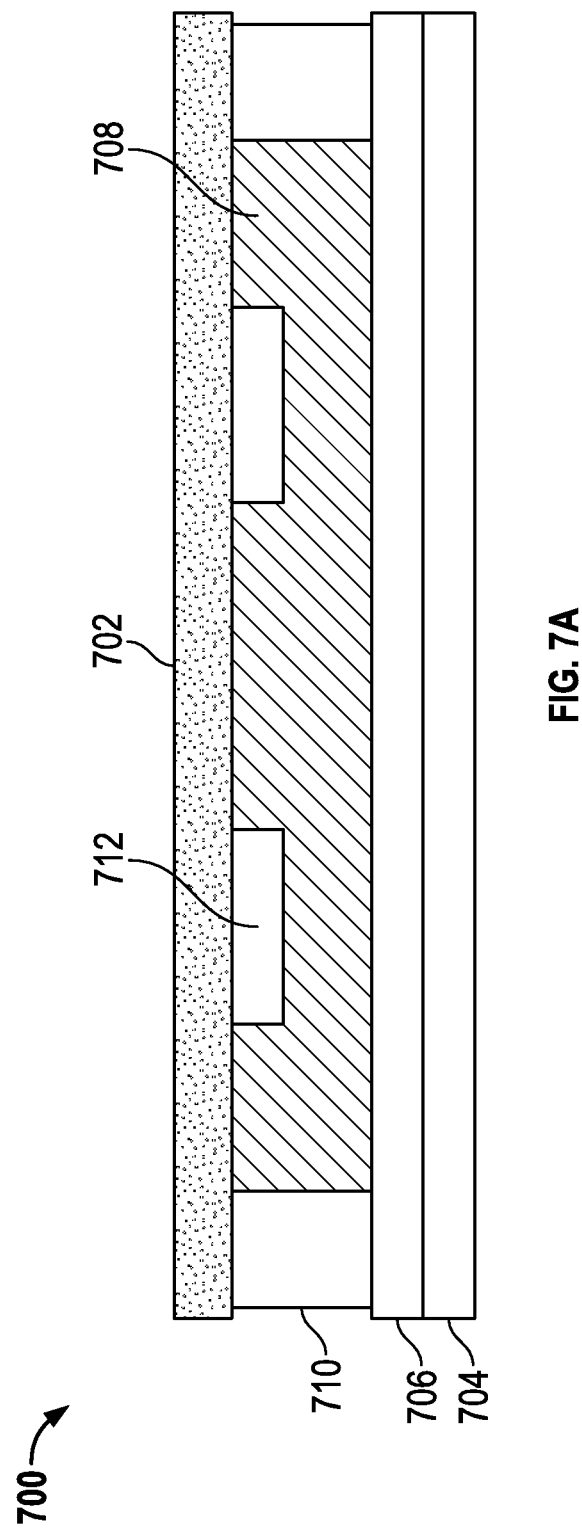
FIG. 7A illustrates an exemplary display panel stackup sub-photo spacer arrangement.

Additionally, an LCD display may include column spacers, also known as sub-photo spacers, in order to provide adequate protection to the LCD display from deformation caused by external pressure and forces. FIG. 7A illustrates an exemplary display panel stackup sub-photo spacer arrangement. Panel stackup 700 can contain a color filter layer 702 (e.g., glass or plastic) and a TFT layer 704 (e.g., glass or plastic) which can be located, in some examples, on opposing ends of the stackup. TFT layer 704 can have a TFT substrate layer 706 disposed, in some examples, immediately on top of it. TFT substrate layer 706 can contain the electrical components necessary to create the electric field that drives the liquid crystal layer 708. More specifically, TFT substrate layer 706 can include various different layers that can include display elements such as data lines, gate lines, TFTs, common and pixel electrodes, etc. These components can help to create a controlled electric field that orients liquid crystals located in liquid crystal layer 708 into a particular orientation based on the desired color to be displayed at any particular pixel. In the example of FIG. 7A, panel 700 contains two sets of sub-photo spacers 710 and 712. Sub-photo spacers 710 and 712 can differ in height. Sub-photo spacers 710 can be of a height so that one end of the sub-photo spacer touches the color filter layer 702 and the other end of the sub-photo spacer touches the TFT substrate 706. Sub-photo spacers 712 can be of a height such that one end of the sub-photo spacer touch the color filter layer 702 and the other end leaves a gap between the end of the sub-photo spacer and the TFT substrate, which leaves room for the liquid crystal to flow underneath them and spread out. Furthermore, in some examples, the sub-photo spacer density of sub-photo spacer 710 can be different from the sub-photo spacer density of sub-photo spacer 712.

Figure 7B:
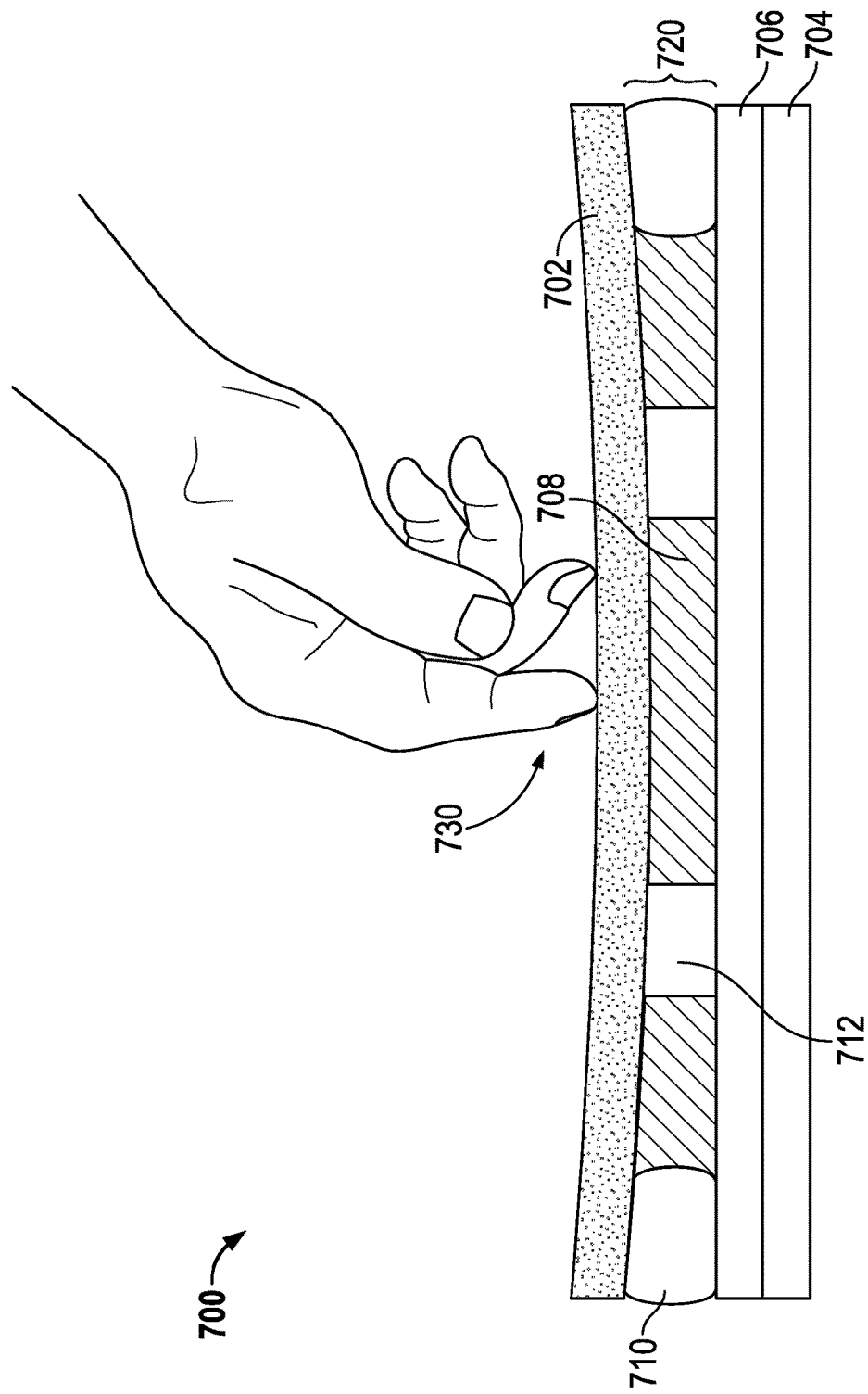
FIG. 7B illustrates the cross-section of the layer stackup of an LCD panel while an external force is being exerted on the panel.

FIG. 7B illustrates the cross-section of the layer stackup of an example LCD panel while an external force 730 is being exerted on the panel. When an external force 230 pushes down on panel 700, sub-photo spacers 710, whose heights are sufficient to span the gap between the color filter layer 702 and TFT substrate layer 706, can begin to compress due to the force. The compression can cause the gap 720 between color filter layer 702 and TFT substrate layer 706 to be reduced. Eventually, as force 730 causes the panel 700 to compress, the gap 720 can become small enough so that sub-photo spacers 712 no longer have a gap between their ends and TFT substrate layer 706. When sub-photo spacers 712 begin to touch TFT substrate layer 706, they can then begin to absorb some of the force 730 being applied, and can minimize or reduce the amount of compression being experienced by sub-photo spacers 710. Sub-photo spacers 712 can make this possible by providing additional support to sub-photo spacers 710 prior to sub-photo spacers 710 compressing to the point where they become permanently deformed. This can allow the sub-photo density of sub-photo spacers 710 to remain lower, allowing for adequate room for the liquid crystal layer 708 to spread out. The sub-photo spacer density of sub-photo spacers 712 can remain high as compared to sub-photo spacers 710, because they do not impede the liquid crystal layer.

As described above, the architecture of a conventional integrated touch screen allows the touch screen to detect the presence of a finger above or at the screen. However, the architecture of a conventional integrated touch screen does not allow the touch screen to detect how much force is being applied to the surface of the touch screen. Modifying the architecture of an integrated touch screen to integrate a pressure sensor can provide the capability to measure the force being applied to the surface of the touch screen.

Figure 8:
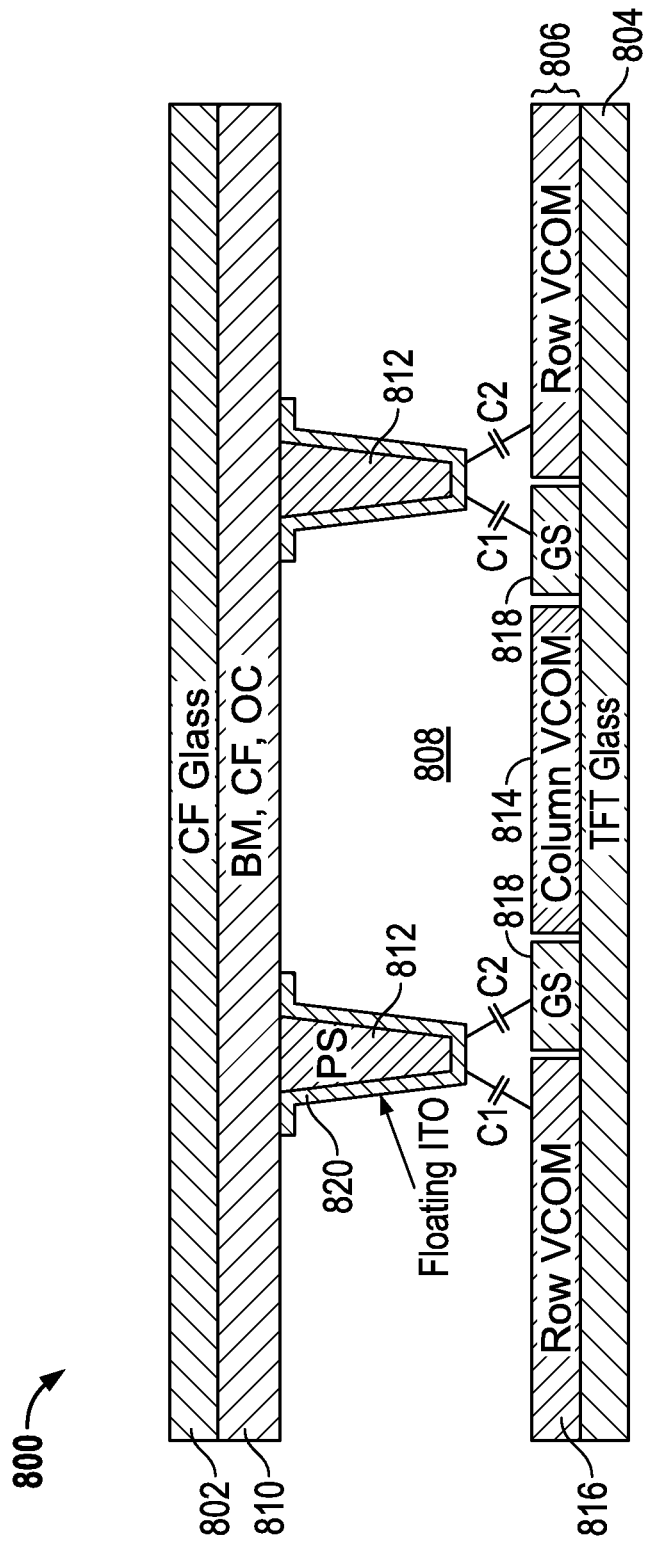
FIG. 8 illustrates the layer stackup of an exemplary integrated touch screen with integrated pressure sensors.

FIG. 8 illustrates the layer stackup of an exemplary integrated touch screen with integrated pressure sensors. LCD Panel 800 can include multiple layers bonded together to form one LCD panel. For instance, LCD panel 800 can consist of a color filter layer 802 and a TFT layer 804 which can be located on opposing ends of the stackup. TFT layer 804 can have a TFT substrate layer 806 disposed immediately on top of it. TFT substrate layer 806 can contain the electrical components necessary to create the electric field that drives the liquid crystal layer 808. Specifically, TFT substrate layer 806 can include various different layers that include display elements such as data lines, gate lines, TFTs, common and pixel electrodes, etc. These components can help create a controlled electric field that orients liquid crystals located in liquid crystal layer 808 into a particular orientation, based on the desired color to be displayed at any particular pixel. More specifically, the TFT substrate layer 806 can include row and column common electrodes, illustrated in FIG. 8 as Column Vcom 814 and Row Vcom 816. TFT substrate layer 806 can include guard shield electrodes 818 between Column Vcom 814 and Row Vcom 816 to minimize interference caused by the fringe fields that can be created between the row Vcom and Column Vcom. Color filter layer 802 can have a color filter substrate layer 810 disposed immediately below it. Color filter substrate layer 810 can contain various components associated with an LCD display such as a color filter, a black matrix, and an organic layer overcoat.

A set of sub-photo spacers 812 can be disposed on color filter substrate layer 810. The sub-photo spacers can be positioned over the edge between Row Vcom 816 and an adjacent guard shield electrode 818. A floating conductive material layer, such as a floating indium-tin oxide (ITO) layer 820, can be patterned on top of the sub-photo spacers 812. Fringing capacitance C1 can be formed between Row Vcom 816 and the floating ITO layer 820. Fringing capacitance C2 can be formed between guard shield electrode 818 and the floating ITO layer 820. During operation of the pressure sensing function, an external pressure force can decrease the gap between the sub-photo spacer 812 and the TFT substrate layer 806. The changing gap between the floating ITO layer 820 and both Row Vcom 816 and guard shield electrode 818 can change capacitances C1 and C2. The external pressure force can be determined by measuring the change in capacitance over the series combination of C1 and C2.

Figure 9:
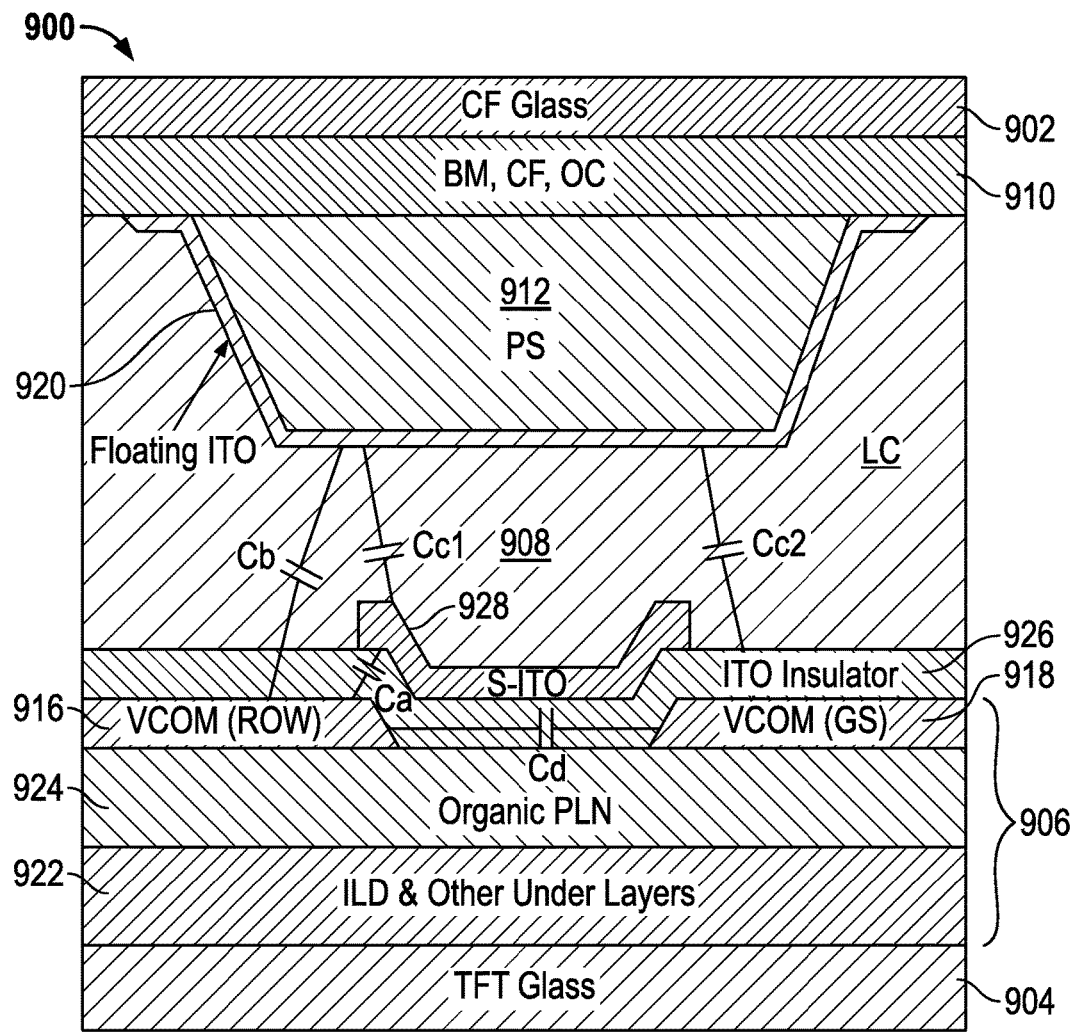
FIG. 9 illustrates a more detailed view of the layer stackup of an exemplary integrated touch screen with an integrated pressure sensor.

FIG. 9 illustrates a detailed view of the layer stackup of an exemplary integrated touch screen with an integrated pressure sensor. For clarity of illustration only one pressure sensor is shown, but it should be understood that the integrated touch screen can include a plurality of pressure sensors. LCD Panel 900 can include a color filter layer 902 and a TFT layer 904 which can be located on opposing ends of the stackup. TFT layer 904 can have a TFT substrate layer 906 disposed on top of it. TFT substrate layer 906 can contain the electrical components necessary to create the electric field that drives the liquid crystal layer 908. Specifically, TFT substrate layer 906 can include various different layers that include display elements such as data lines, gate lines, TFTs, common and pixel electrodes, etc. These components can help create a controlled electric field that orients liquid crystals located in liquid crystal layer 908 into a particular orientation, based on the desired color to be displayed at any particular pixel. More specifically, the TFT substrate layer 906 illustrated in FIG. 9 can include an interlayer dielectric (ILD) and other under layers 922, an organic planarization layer 924, Row Vcom 916, guard shield 918, and S-ITO 928. Row Vcom 916, guard shield 918 and S-ITO 928 can be insulated from one another using an ITO insulator 926. Color filter layer 902 can have a color filter substrate layer 910 disposed immediately below it. Color filter substrate layer 910 can contain the color filter, black matrix, and overcoat.

A sub-photo spacer 912 can be disposed on color filter substrate layer 910. The sub-photo spacer 912 can be positioned over the edge between Row Vcom 916 and guard shield 918. A floating ITO layer 920 can be patterned on top of the sub-photo spacer 912. Fringing capacitance Ca can be formed between S-ITO 928 and Row Vcom 916. Fringing capacitance Cc1 can be formed between S-ITO 928 and floating ITO later 920. Fringing capacitance Cb can be formed between Row Vcom 916 and the floating ITO layer 920. Fringing capacitance Cc2 can be formed between guard shield 918 and the floating ITO layer 920. Fringing capacitance Cd can be formed between Row Vcom 916 and guard shield 918. During operation of the pressure sensing function, an external pressure force can decrease the gap between the sub-photo spacer 912 and the TFT substrate layer 906. The changing gap between the floating ITO layer 920 the other electrodes (including Row Vcom 916, guard shield 918 and S-ITO 928) can change capacitances Cb, Cc1 and Cc2. The external pressure force can be determined by measuring the change in capacitance between Row Vcom 916 and guard shield 918.

Figure 10:
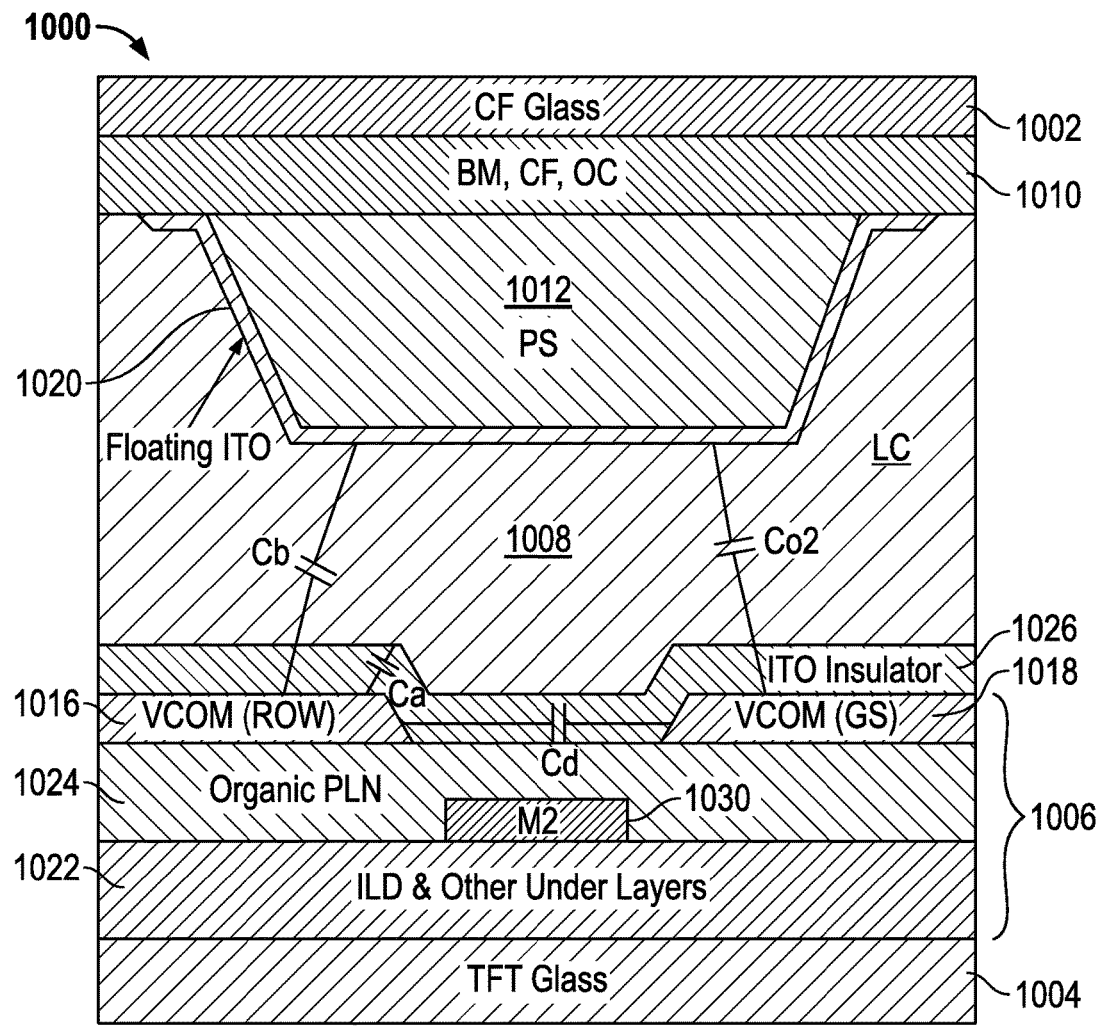
FIG. 10 illustrates a more detailed view of an alternative layer stackup of an exemplary integrated touch screen with an integrated pressure sensor.

FIG. 10 illustrates a more detailed view of an alternative layer stackup of an exemplary integrated touch screen with an integrated pressure sensor. For the sake of simplicity only one pressure sensor is shown, but it should be understood that the integrated touch screen can include a plurality of pressure sensors. LCD Panel 1000 can include a color filter layer 1002 and a TFT layer 1004 which can be located on opposing ends of the stackup. TFT layer 1004 can have a TFT substrate layer 1006 disposed immediately on top of it. TFT substrate layer 1006 can contain the electrical components necessary to create the electric field that drives the liquid crystal layer 1008. Specifically, TFT substrate layer 1006 can include various different layers that include display elements such as data lines, gate lines, TFTs, common and pixel electrodes, etc. These components can help create a controlled electric field that orients liquid crystals located in liquid crystal layer 1008 into a particular orientation, based on the desired color to be displayed at any particular pixel. More specifically, the TFT substrate layer 1006 illustrated in FIG. 10 can include an interlayer dielectric (ILD) and other under layers 1022, an organic planarization layer 1024, Row Vcom 1016, guard shield 1018, and second metallization layer (M2) 1030. Row Vcom 1016, and guard shield 1018 are insulated from floating ITO layer 1020 using an ITO insulator 1026. Color filter layer 1002 can have a color filter substrate layer 1010 disposed immediately below it. Color filter substrate layer 1010 can contain the color filter, black matrix, and overcoat.

A sub-photo spacer 1012 can be disposed on color filter substrate layer 1010. The sub-photo spacer 1012 can be positioned over the edge between Row Vcom 1016 and guard shield 1018. A floating ITO layer 1020 can be patterned on top of the sub-photo spacer 1012. Fringing capacitance Cb can be formed between Row Vcom 1016 and the floating ITO layer 1020. Fringing capacitance Cc can be formed between guard shield 1018 and the floating ITO layer 1020. Fringing capacitance Cd can be formed between Row Vcom 1016 and guard shield 1018. During operation of the pressure sensing function, an external pressure force can decrease the gap between the sub-photo spacer 1012 and the TFT substrate layer 1006. The changing gap between the floating ITO layer 1020 and both Row Vcom 1016 and guard shield 1018 can change capacitances Cb and Cc. The external pressure force can be determined by measuring the change in capacitance between Row Vcom 1016 and guard shield 1018.

Using metallization layer M2 1030 instead of S-ITO 928 in the layer stackup can be advantageous in removing parasitic capacitances Ca and Cc1 (as illustrated in FIG. 9). Removing parasitic capacitances can improve the ability to measure pressure applied to the integrated touch screen.

Figure 11A:
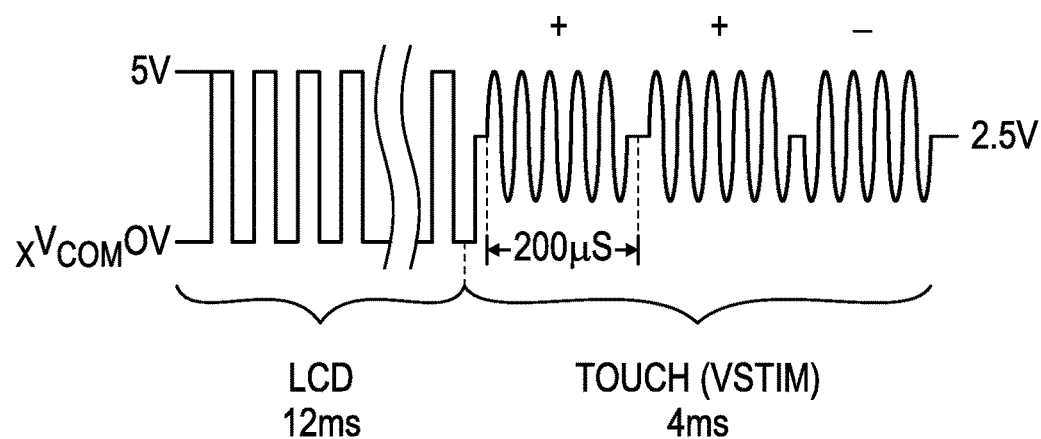
FIGS. 11A and 11B illustrate the exemplary signals applied to an integrated touch screen during an example display phase and during an example touch phase.
Figure 11B:
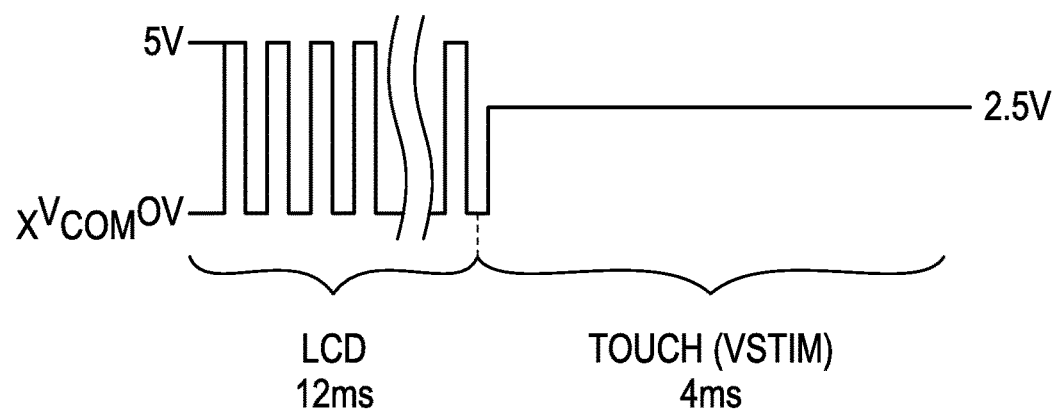

Multi-function circuit elements of an exemplary integrated touch screen with an integrated pressure sensor can operate in a display phase, touch phase or pressure phase (also known as a display mode, touch sensing mode, or pressure sensing mode). FIGS. 11A and 11B illustrate the exemplary signals applied to an integrated touch screen during an example display phase and during an example touch phase. FIGS. 11A and 11B show example signals applied through Row Vcom (xVcom) and Column Vcom (yVcom) to the drive display pixels during the display phase. Row Vcom (xVcom) and Column Vcom (yVcom) can be driven with a square wave signal of 2.5V+/−2.5V, for example, in order to perform LCD inversion. The display phase can be 12 ms in duration, for example.

During the touch phase, Row Vcom (xVcom) can be driven with an AC signal, such as a sinusoidal wave, a square wave, a triangular wave, etc. In the example shown in FIG. 11A, Row Vcom (xVcom) can be driven with 15 to 20 consecutive stimulation phases lasting 200 microseconds each while Column Vcom (yVcom) can be maintained at the virtual ground of a charge amplifier as shown in FIG. 11B. The drive signals in this case can be square or sinusoidal signals of 2.5V+/−2V, for example, each having the same frequency and a relative phase of either 0 degrees or 180 degrees (corresponding to "+" and "−" in FIG. 11A), for example. The touch phase can be 4 ms in duration, for example.

Figure 12:
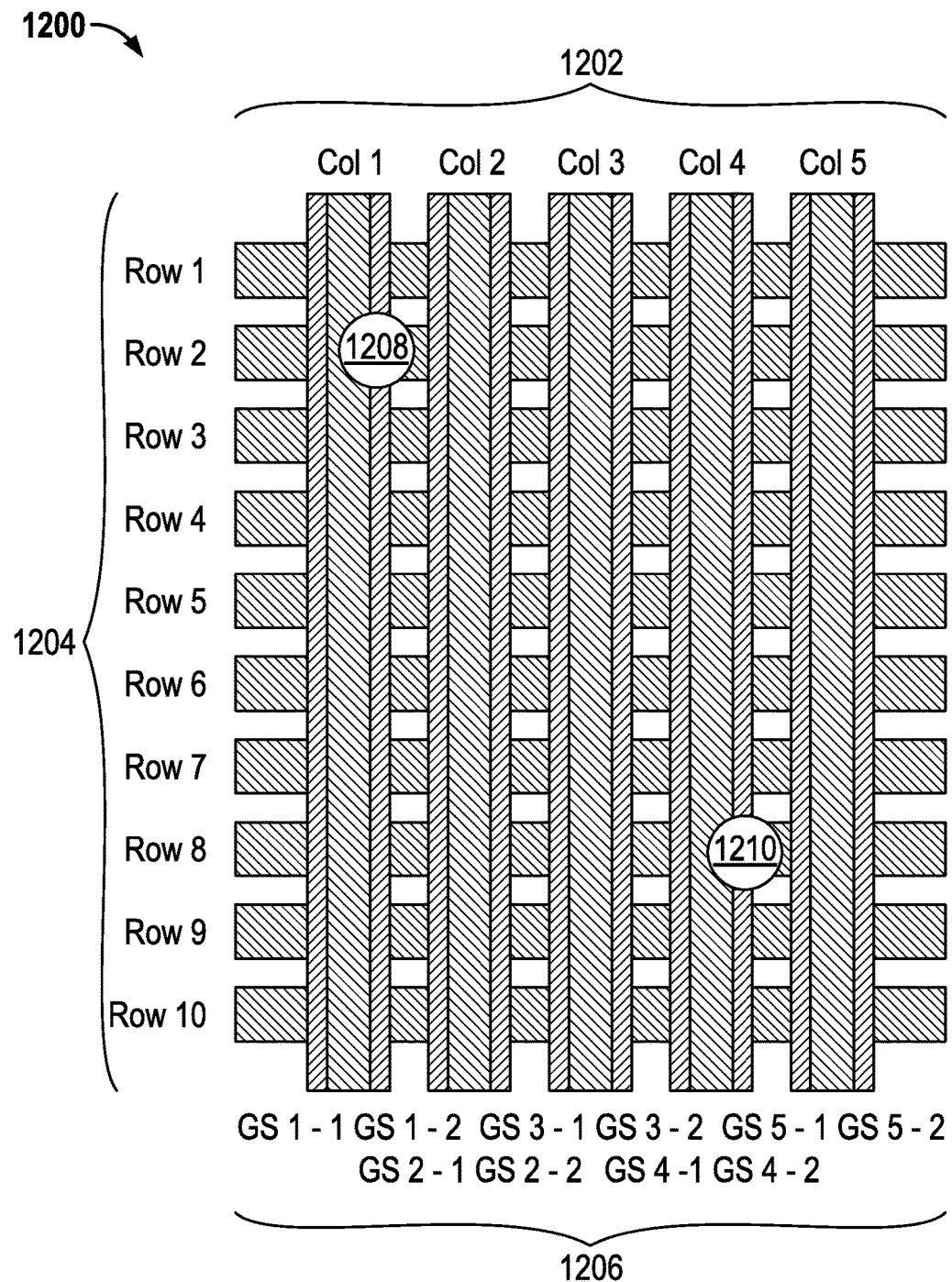
FIG. 12 illustrates an exemplary driving scheme to integrate pressure sensing on an integrated touch screen.

FIG. 12 illustrates an exemplary driving scheme to integrate pressure sensing on an integrated touch screen. Touch screen 1200 includes sense (or drive) regions (Col 1 to Col 5) formed as columns 1202 and rows of drive (or sense) regions (Row 1 to Row 10) formed as rows 1204. Although touch screen 1200 is illustrated as having five columns and ten rows, it should be understood that any number of columns and rows can be used in the touch screen. The columns 1202 can be separated on either side from the adjacent rows 1204 by guard shields 1206 (GS 1-1 to GS 5-2).

As described above in relation to FIG. 11, the rows and columns can sense or be driven with different signals during the display phase and touch phase. The signal can be an AC signal, such as a sinusoidal wave, a square wave, a triangular wave, etc. Similarly, during a pressure sensing phase, the rows and columns can sense or be driven with different signals. For example, during a touch phase rows 1204 can be driven by stimulation signals and columns 1202 can sense the mutual capacitance between the rows and columns.

Guard shields 1206 can be grounded during the touch phase. During the touch phase the touch screen can, for example, detect touch location A 1208 and touch location B 1210.

During a pressure phase, stimulation signals can be applied to rows where touch events were detected during a touch phase (although in other examples all rows can be driven). One advantage of driving only the rows where touch events were detected during a touch phase can be power savings during the pressure phase by only driving specific rows as necessary. The change in mutual capacitance between the row and guard shield can be detected at the locations where touch events were detected during a touch phase. For example, in FIG. 12, touch location A 1208 can be detected at row 2, column 1 and touch location B 1210 can detected at row 8, column 4 during the touch phase. During the pressure phase, stimulation signals can be applied to row 2 and row 8 and the mutual capacitance can be sensed at guard shield 1-2 and guard shield 4-2.

Because the guard shields 1206 of a conventional integrated touch screen are grounded during the touch phase, each pair of guard shields associated with a column can be connected in pair to the external touch controlling IC. In modified architecture integrating a pressure phase, however, each guard shield must be connected separately to the external touch controlling IC. Measurements of capacitance between a row and guard shield can be made on the external touch controlling IC.

Figure 13A:
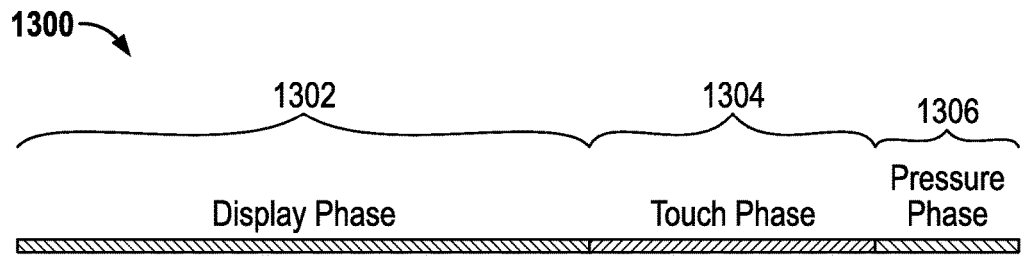
FIG. 13A illustrates an exemplary operation of a display phase, touch phase and pressure phase on an exemplary integrated touch screen.

FIG. 13A illustrates an exemplary operation of a display phase, touch phase and pressure phase on an exemplary integrated touch screen. A time frame 1300 can be divided into three phases. During display phase 1302, Row Vcom and Column Vcom can be driven to operate an LCD display as shown in FIGS. 11A and 11B. During touch phase 1304, Row Vcom can be stimulated and Column Vcom can remain at the virtual ground as shown in FIGS. 11A and 11B. During pressure phase 1306, Row Vcom can be stimulated and Column Vcom can remain at virtual ground.

Figure 13B:
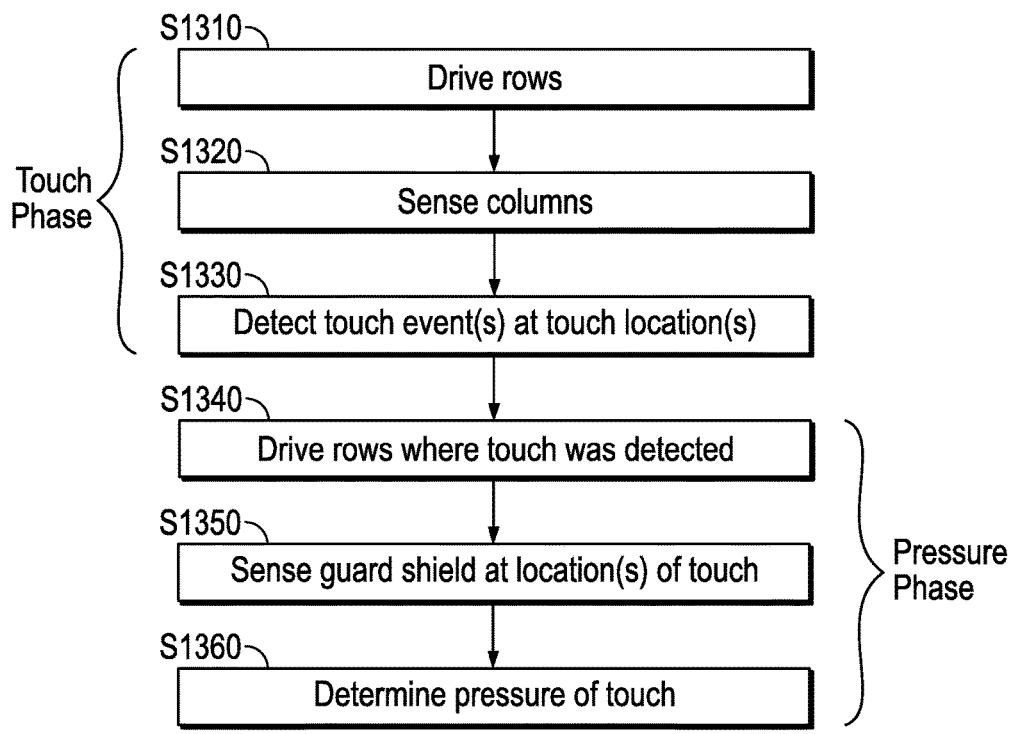
FIG. 13B illustrates an exemplary method of operation of a touch phase and pressure phrase on an exemplary integrated touch screen in more detail.

FIG. 13B illustrates an exemplary method of operation of a touch phase and pressure phrase on an exemplary integrated touch screen in more detail. At step S1310, during the touch phase 1304, drive lines (rows) 222 can be driven by stimulation signals 216 from driver logic 214 through a drive interface 224. Guard shields can be grounded during touch phase 1304. At step S1320, the resulting sense signals 217 generated in sense lines (columns) 223 can be transmitted through a sense interface 225 to sense channels 208 (also referred to as an event detection and demodulation circuit) in touch controller 206. At step S1330, the touch controller can detect touch events (e.g. object proximity to the surface or object contact on the surface of the touch screen) based on changes in capacitance or capacitive coupling detected at touch nodes.

At step S1340, during the pressure phase 1306, drive lines (rows) 222 can be driven by stimulation signals 216 from driver logic 214 through a drive interface 224. The same driver circuitry used for the touch phase can be used for the pressure phase. Alternatively, the stimulation signals can be multiplexed to the drive lines from a different controller. Specifically, only those drive lines (rows) where a touch event was detected in step S1330 can be driven by stimulation signals 216. Columns (sense lines in touch phase 1304) can remain at virtual ground during pressure phase 1306. At step S1350, the resulting sense signals generated in guard shields can be transmitted to an event detection and demodulation circuit in touch controller 206. Alternatively, the sense signal generated can be multiplexed to sense channels on a different controller. At step S1360, the touch controller can detect the pressure of touch events based on changes in capacitance detected on the guard shield at the location of touch events.

Figure 14:
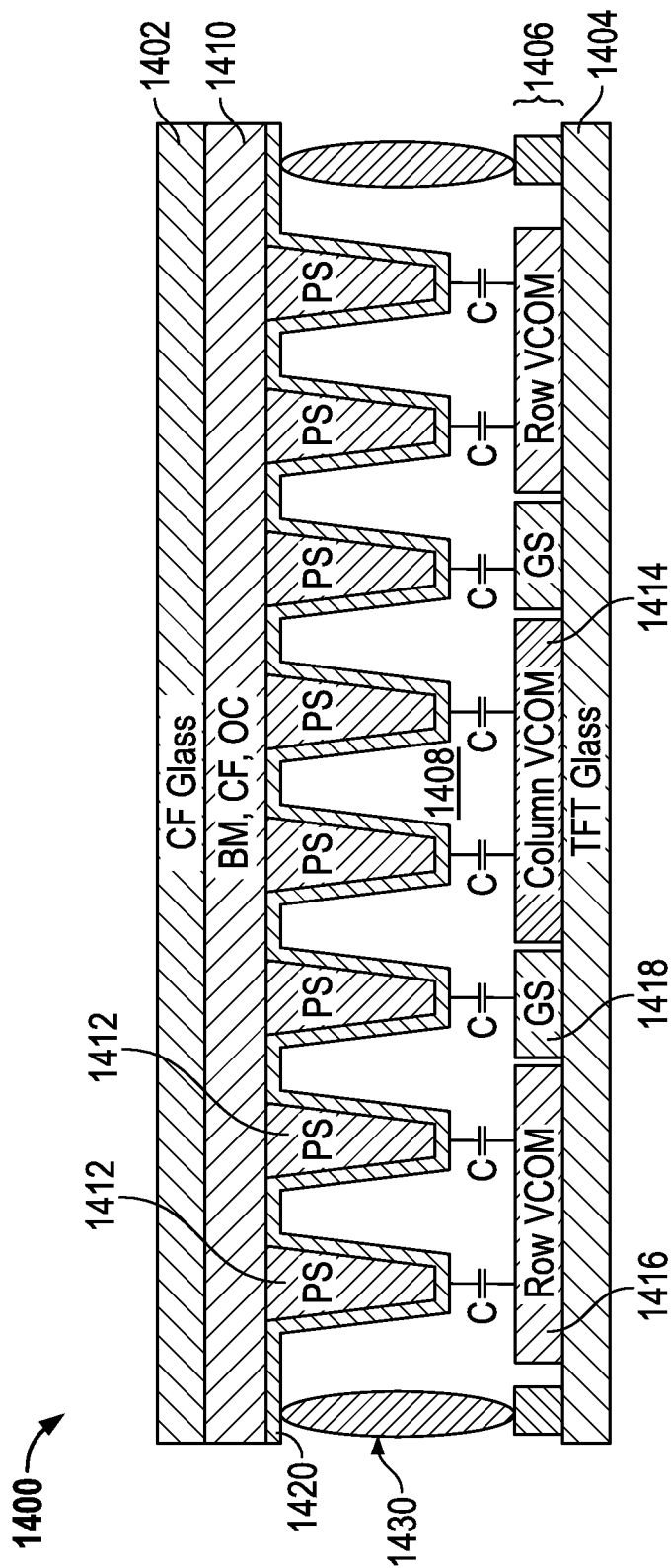
FIG. 14 illustrates the layer stackup of another exemplary integrated touch screen with integrated pressure sensors.

FIG. 14 illustrates the layer stackup of another exemplary integrated touch screen with integrated pressure sensors. LCD Panel 1400 can include multiple layers bonded together to form one LCD panel. For instance, LCD panel 1400 can consist of a color filter layer 1402 and a TFT layer 1404 which can be located on opposing ends of the stackup. TFT layer 1404 can have a TFT substrate layer 1406 disposed immediately on top of it. TFT substrate layer 1406 can contain the electrical components necessary to create the electric field that drives the liquid crystal layer 1408. Specifically, TFT substrate layer 1406 can include various different layers that include display elements such as data lines, gate lines, TFTs, common and pixel electrodes, etc. These components can help create a controlled electric field that orients liquid crystals located in liquid crystal layer 1408 into a particular orientation, based on the desired color to be displayed at any particular pixel. More specifically, the TFT substrate layer 1406 can include row and column common electrodes, illustrated in FIG. 14 as Column Vcom 1414 and Row Vcom 1416. Guard shields 1418 can separate between Column Vcom 1414 and Row Vcom 1416 to minimize interference. Color filter layer 1402 can have a color filter substrate layer 1410 disposed immediately below it. Color filter substrate layer 1410 can contain the color filter, black matrix, and overcoat.

A set of sub-photo spacers 1412 can be disposed on color filter substrate layer 1410. An indium-tin oxide (ITO) layer 1420 can be patterned on top of the sub-photo spacers 1412 and the color filter substrate layer 1410. One advantage of this stackup is the manufacturing advantage of depositing the ITO layer 1420 in a single step. All of the ITO on this layer can be electrically connected together. ITO layer 1420 can be connected to the ITO routing on the TFT layer 1404. This connection can be made, for example, using a ball of silver 1430. Alternative means of connection can be used as are known in the art. Fringing capacitance C can be formed between the ITO layer 1420 and each electrode (including Column Vcom 1414, Row Vcom 1416 and guard shields 1418) on the TFT substrate layer 1406. During operation of the pressure sensing function, an external pressure force can decrease the gap between the sub-photo spacer 1412 and the TFT substrate layer 1406. The changing gap between the ITO layer 1420 and each electrode on the TFT substrate layer 1406 can change capacitances formed between them. The external pressure force can be determined by measuring the change in capacitance at the specific touch location. The capacitance measured can be self capacitance.

Figure 15:
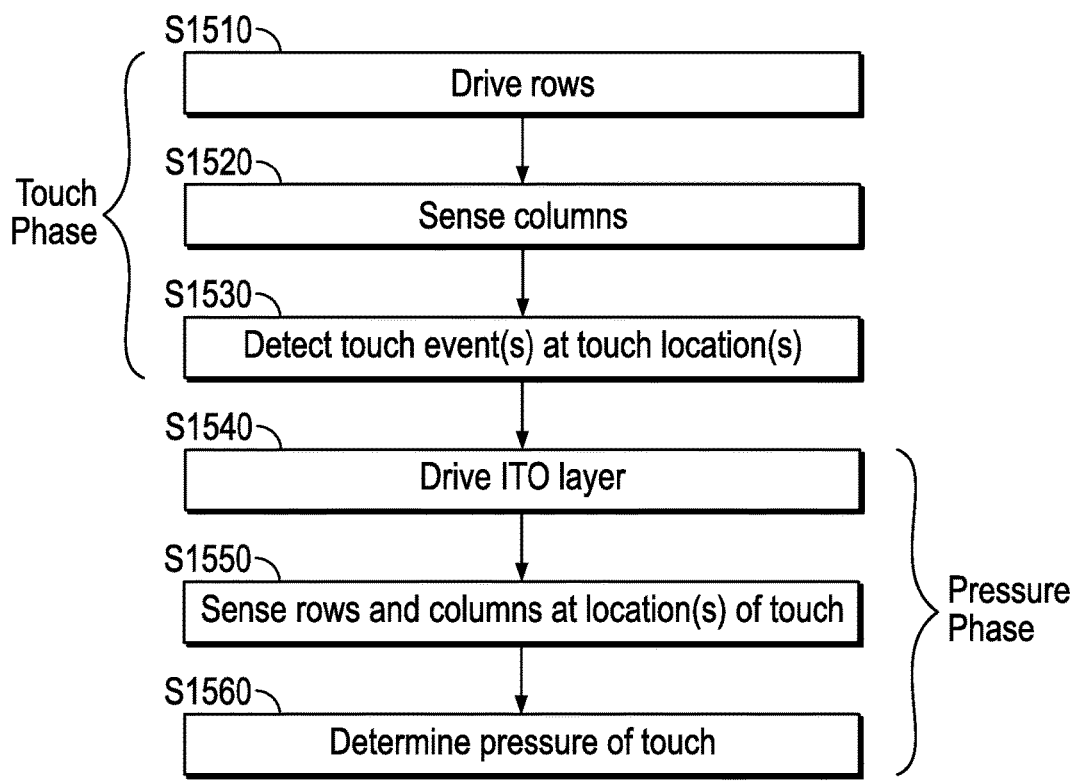
FIG. 15 illustrates an exemplary method of operation of a touch phase and pressure phrase on an exemplary integrated touch screen in more detail.

FIG. 15 illustrates an exemplary method of operation of a touch phase and pressure phrase on an exemplary integrated touch screen in more detail. At step S1510, during the touch phase 1304, drive lines (rows) 222 can be driven by stimulation signals 216 from driver logic 214 through a drive interface 224. Guard shields can be grounded during touch phase 1304. At step S1520, the resulting sense signals 217 generated in sense lines (columns) 223 can be transmitted through a sense interface 225 to sense channels 208 (also referred to as an event detection and demodulation circuit) in touch controller 206. At step S1530, the touch controller can detect touch events based on changes in capacitance detected at touch nodes.

At step S1540, during the pressure phase 1306, ITO layer 1420 can be driven by stimulation signals through the ITO routing on the TFT layer 1404. Guard shields can remain grounded during pressure phase 1306. At step S1550, the resulting sense signals generated in drive lines (rows) 222 and sense lines (columns) 223 can be transmitted to an event detection and demodulation circuit in touch controller 206 or a different controller. At step S1560, the touch controller can detect the pressure of touch events based on changes in capacitance detected on the rows and columns at the detected touch locations.

Therefore according to the above disclosure, some examples of the disclosure are directed to a display, comprising: a first layer having a plurality of spacers formed thereon; and a second layer formed with a separation relative to the first layer, the second layer including a plurality of circuit elements; wherein the plurality of circuit elements are configurable for coupling with one or more of the spacers in a pressure sensing mode. Additionally or alternatively to one or more examples disclosed above, in other examples the display further comprising conductive material formed over the plurality of spacers for coupling with the one or more circuit elements in the pressure sensing mode. Additionally or alternatively to one or more examples disclosed above, in other examples the plurality of circuit elements are further configurable for operating with the first layer in a display mode. Additionally or alternatively to one or more examples disclosed above, in other examples the plurality of circuit elements are further configurable for coupling with objects proximate to the display in a touch sensing mode. Additionally or alternatively to one or more examples disclosed above, in other examples the plurality of circuit elements are further configurable for forming a plurality of row electrodes, column electrodes, and guard shield electrodes. Additionally or alternatively to one or more examples disclosed above, in other examples one or more of the plurality of row electrodes, column electrodes, and guard shield electrodes are further configurable for generating signals indicative of an amount of pressure in the pressure sensing mode. Additionally or alternatively to one or more examples disclosed above, in other examples one or more of the spacers are formed over a boundary between a row electrode, a column electrode, or a guard shield electrode. Additionally or alternatively to one or more examples disclosed above, in other examples the display is a liquid crystal display (LCD), and the plurality of circuit elements include a common electrode layer of the LCD. Additionally or alternatively to one or more examples disclosed above, in other examples, the first layer is a color filter layer, and the spacers are sub-photo spacers formed on the color filter layer. Additionally or alternatively to one or more examples disclosed above, in other examples the conductive material formed over each spacer is floating. Additionally or alternatively to one or more examples disclosed above, in other examples the conductive material formed over the plurality of spacers is electrically connected together. Additionally or alternatively to one or more examples disclosed above, in other examples the conductive material formed over the plurality of spacers is configured for receiving a stimulation signal.

Additionally or alternatively to the one or more examples disclosed above, other examples of the disclosure are directed to a controller, the controller comprising: a plurality of drivers configured for stimulating one or more drive lines in a stackup; a plurality of sense channels configured for detecting changes in capacitive coupling in the stackup; and a processor capable of configuring the plurality of sense channels for detecting object proximity at the stackup in a touch sensing mode, and configuring the plurality of sense channels for detecting object pressure at the stackup in a pressure sensing mode. Additionally or alternatively to one or more examples disclosed above, in other examples the processor further capable of configuring the plurality of drivers for stimulating those drive lines at which object proximity has been detected. Additionally or alternatively to one or more examples disclosed above, in other examples the processor further capable of configuring the plurality of drivers for stimulating conductive material formed over spacers in the stackup in the pressure sensing mode. Additionally or alternatively to one or more examples disclosed above, in other examples the plurality of sense channels configurable for sensing changes in capacitive coupling between one or more spacers in the stackup and one or more of a plurality of rows, plurality of columns, and a plurality of ground shields in the stackup. Additionally or alternatively to one or more examples disclosed above, in other examples the processor further capable of determining an amount of object pressure based on the sensed change in capacitive coupling.

Additionally or alternatively to the one or more examples disclosed above, other examples of the disclosure are directed to a method for sensing pressure in a display, the method comprising: forming conductive material over a plurality of spacers on a first layer of the display; detecting changes in capacitive coupling between one or more of the spacers and one or more of a plurality of circuit elements on a second layer of the display; and determining an amount of object pressure on the display based on the detected changes in capacitive coupling between the spacers and the circuit elements. Additionally or alternatively to one or more examples disclosed above, in other examples the method further comprising operating the plurality of circuit elements with the first layer in a display mode. Additionally or alternatively to one or more examples disclosed above, in other examples the method further comprising: detecting changes in capacitive coupling at one or more of the circuit elements; and determining an amount of object proximity at the display based on based on the detected changes in capacitive coupling at the one or more circuit elements. Additionally or alternatively to one or more examples disclosed above, in other examples the method further comprising: configuring the plurality of circuit elements to form a plurality of row electrodes, column electrodes, and guard shield electrodes; and generating signals at one or more of the plurality of row electrodes, column electrodes, and guard shield electrodes indicative of an amount of pressure in the pressure sensing mode. Additionally or alternatively to one or more examples disclosed above, in other examples the method further comprising forming one or more of the spacers over a boundary between a row electrode, a column electrode, or a guard shield electrode. Additionally or alternatively to one or more examples disclosed above, in other examples the method further comprising floating the conductive material formed over each spacer. Additionally or alternatively to one or more examples disclosed above, in other examples the method further comprising electrically connecting the conductive material formed over the plurality of spacers. Additionally or alternatively to one or more examples disclosed above, in other examples the method further comprising stimulating the conductive material formed over the plurality of spacers with an AC signal.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A display, comprising:
a first layer having a plurality of spacers formed thereon;
a second layer formed with a separation relative to the first layer, the second layer including a plurality of circuit elements,
the plurality of circuit elements including:
guard shield electrodes configurable for coupling to ground in a touch sensing mode and configurable for coupling with at least one of the plurality of spacers in a pressure sensing mode, and
a plurality of common electrodes; and sense circuitry configured to:
measure a change in a first capacitive coupling, the first capacitive coupling between at least two of the plurality of common electrodes in the touch sensing mode, the first change in capacitive coupling due to objects proximate to the display,
measure a change in a second capacitive coupling, the second capacitive coupling between at least one of the guard shield electrodes and a first spacer of the plurality of spacers in the pressure sensing mode, and
determine an amount of pressure based on at least the change in the second capacitive coupling,
wherein the first spacer is formed over a boundary between the at least one guard shield electrode and at least one of the plurality of common electrodes.

2. The display of claim 1, further comprising conductive material formed over the plurality of spacers for coupling with the plurality of circuit elements in the pressure sensing mode.

3. The display of clam 2, wherein the conductive material formed over the plurality of spacers is floating.

4. The display of claim 2, wherein the conductive material formed over the plurality of spacers is electrically connected together.

5. The display of claim 4, wherein the conductive material formed over the plurality of spacers is configured for receiving a stimulation signal.

6. The display of claim 2, wherein the conductive material formed over the plurality of spacers is patterned.

7. The display of claim 1, wherein the plurality of circuit elements are further configurable for operating with the first layer in a display mode.

8. The display of claim 1, wherein the plurality of common electrodes include a plurality of row electrodes and a plurality of column electrodes.

9. The display of claim 1, wherein the sense circuitry is further configured to measure a change in a third capacitive coupling, the third capacitive coupling between the at least one of the plurality of common electrodes and the first spacer of the plurality of spacers, wherein the determination of the amount of pressure is further based on change in the third capacitive coupling.

10. The display of claim 1, wherein the display is a liquid crystal display (LCD), and the second layer includes a common electrode layer of the LCD.

11. The display of claim 10, wherein the first layer is a color filter layer, and the plurality of spacers are sub-photo spacers formed on the color filter layer.

12. A controller, comprising:
a plurality of drivers configured for stimulating one or more drive lines in a stackup;
a plurality of sense channels configured for detecting changes in capacitive coupling in the stackup; and
a processor capable of during a touch sensing mode:
configuring the plurality of sense channels for detecting a change in a first capacitive coupling between a plurality of common electrodes located on a layer due to object proximity at the stackup, and
configuring at least one guard shield electrode located on the layer to be grounded, and
during a pressure sensing mode:
configuring the plurality of sense channels for detecting a change in a second capacitive coupling between at least one spacer and the at least one guard shield electrode located on the layer,
configuring the plurality of sense channels for detecting a change in a third capacitive coupling between the at least one spacer and at least one common electrode of the plurality of common electrodes, the changes in the second capacitive coupling and the third capacitive coupling indicative of an amount of object-pressure on the stackup,
wherein the at least one spacer is formed over a boundary between the at least one guard shield electrode and the at least one common electrode.

13. The controller of claim 12, the processor further capable of configuring the plurality of drivers for stimulating those drive lines at which object proximity has been detected.

14. The controller of claim 12, the processor further capable of configuring the plurality of drivers for stimulating conductive material formed over the at least one spacer in the stackup.

15. The controller of claim 12, the processor further capable of configuring the plurality of sense channels for detecting a change in a third capacitive coupling between at least one spacer in the stackup and at least one of a plurality of rows, or at least one of a plurality of columns or both.

16. The controller of claim 15, the processor further capable of determining the amount of object pressure based on the change in the third capacitive coupling.

17. A method for sensing pressure in a display, comprising:
forming conductive material over a plurality of spacers on a first layer of the display;
detecting a change in a first capacitive coupling between a plurality of common electrodes on a second layer of the display in a touch sensing mode;
grounding a plurality of guard shield electrodes in the touch sensing mode;
determining an amount of object proximity based on the detected changes in the first capacitive coupling at the plurality of common electrodes;
detecting a change in a second capacitive coupling between one or more of the plurality of spacers and one or more of the plurality of guard shield electrodes in a pressure sensing mode, the plurality of guard shield electrodes on the second layer of the display and included in a plurality of circuit elements;
detecting a change in a third capacitive coupling between the one or more of the plurality of spacers and one or more of the plurality of common electrodes; and
determining an amount of object pressure on the display based on the detected change in the second capacitive coupling between the one or more of the plurality of spacers and one or more of the plurality of guard shield electrodes and the detected change in the third capacitive coupling between the one or more of the plurality of spacers and the one or more of the plurality of common electrodes.

18. The method of claim 17, further comprising operating the plurality of circuit elements with the first layer in a display mode.

19. The method of claim 17, further comprising:
configuring the plurality of circuit elements to form a plurality of row electrodes, a plurality of column electrodes, and the plurality of guard shield electrodes; and
generating signals at one or more of the plurality of row electrodes, one or more of the plurality of column electrodes, and one or more of the plurality of guard shield electrodes indicative of the amount of object pressure in the pressure sensing mode.

20. The method of claim 17, further comprising forming the plurality of spacers over a boundary between a row electrode, a column electrode, or one or more of the plurality of guard shield electrodes.

21. The method of claim 17, further comprising floating the conductive material formed over each spacer.

22. The method of claim 21, further comprising stimulating the conductive material formed over the plurality of spacers with an AC signal.

23. The method of claim 17, further comprising electrically connecting the conductive material formed over the plurality of spacers.

24. The method of claim 17, further comprising:

driving the common electrodes to display an image on the display, wherein detecting the change in first capacitive coupling, detecting the second change in capacitive coupling, and driving the common electrodes are time multiplexed.

* * * * *